US008562155B2

(12) United States Patent
Uematsu et al.

(10) Patent No.: US 8,562,155 B2
(45) Date of Patent: Oct. 22, 2013

(54) ON-VEHICLE MULTIDIRECTIONAL VISUAL-RECOGNITION DEVICE

(75) Inventors: Hiroshi Uematsu, Wako (JP); Yuya Kishimoto, Wako (JP); Norio Mugikura, Wako (JP); Tomoaki Hosobe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/822,143

(22) Filed: Jun. 23, 2010

(65) Prior Publication Data
US 2011/0013301 A1    Jan. 20, 2011

(30) Foreign Application Priority Data
Jul. 14, 2009 (JP) ................. 2009-165575

(51) Int. Cl.
G02B 5/12 (2006.01)
G02B 5/08 (2006.01)
G02B 5/22 (2006.01)
B60R 1/08 (2006.01)

(52) U.S. Cl.
CPC ...................................... B60R 1/082 (2013.01)
USPC ........................... 359/850; 359/860; 359/892

(58) Field of Classification Search
USPC .......... 359/838–839, 849, 860, 864, 892, 890
See application file for complete search history.

(56) References Cited

U.S. PATENT DOCUMENTS

| 6,601,960 B2 * | 8/2003 | Richard ......................... 359/883 |
| 6,963,439 B2 * | 11/2005 | Tonar ............................ 359/267 |
| 7,179,763 B2 * | 2/2007 | Teyssedre et al. ............... 501/71 |

FOREIGN PATENT DOCUMENTS

| GB | 2208633 A | * | 4/1989 |
| JP | 2004-255915 | | 9/2004 |
| JP | 2004255915 A | * | 9/2004 |
| JP | 2009-173246 | | 8/2009 |

* cited by examiner

Primary Examiner — Scott J Sugarman
Assistant Examiner — Robert E Tallman
(74) Attorney, Agent, or Firm — Ditthavong Mori & Steiner, P.C.

(57) ABSTRACT

An on-vehicle multidirectional visual-recognition device includes a first visual-recognition mechanism including a front door window and a door mirror of a door mirror mechanism. A second visual-recognition mechanism includes a first mirror provided in a door-mirror housing of the door mirror mechanism so as to show a range from a side of a vehicle including an area below the door mirror mechanism to a front side of the vehicle. A sub window transmits light reflected by the first mirror and extends continuously from the front door window toward the front side of the vehicle via a frame. A second mirror reflects the light transmitted through the sub window toward a vehicle occupant. Brightness of the light to be received by the vehicle occupant is set substantially equal to brightness of the light at the first visual-recognition mechanism.

2 Claims, 6 Drawing Sheets

ON-VEHICLE MULTIDIRECTIONAL VISUAL-RECOGNITION DEVICE

CROSS REFERENCES TO RELATED APPLICATIONS

The present application claims priority under 35 U.S.C. §119 to Japanese Patent Application No. 2009-165575, filed Jul. 14, 2009, entitled "On-Vehicle Multidirectional Visual-Recognition Device". The contents of this application are incorporated herein by reference in their entirety.

BACKGROUND OF THE INVENTION

1. Field of the Invention

The present invention relates to an on-vehicle multidirectional visual-recognition device.

2. Description of the Related Art

In an on-vehicle multidirectional visual-recognition device of the related art, a mirror housing that accommodates a main door mirror is equipped with a first mirror provided so as to show objects in the vicinity of the front left wheel, that is, objects within a desired range from below a left door mirror toward the side and the front of the vehicle, and a second mirror provided on a side surface of a front pillar facing the interior of the vehicle cabin so as to reflect light from the first mirror toward a vehicle occupant. The main door mirror can be used for visually checking the rear side of the vehicle, and the second mirror can be used for visually checking the vicinity of the front left wheel (see, for example, Japanese Patent Application No. 2008-16636 previously applied by the present applicant).

However, with the technology discussed in Japanese Patent Application No. 2008-16636, when the second mirror is viewed immediately after viewing the main door mirror, the second mirror may appear to be dark, depending on conditions, such as the weather, sometimes resulting in poor viewability for the vehicle occupant.

In contrast, when the main door mirror is viewed immediately after viewing the second mirror, the main door mirror may suddenly appear to be bright, sometimes making the vehicle occupant feel that the main door mirror is too bright.

SUMMARY OF THE INVENTION

According to one aspect of the present invention, an on-vehicle multidirectional visual-recognition device includes a first visual-recognition mechanism and a second visual-recognition mechanism. The first visual-recognition mechanism includes a door window and a door mirror. The door window is for a front door of a vehicle. The door mirror is of a door mirror mechanism provided on a vehicle-body side portion, which includes the front door, in a vicinity of an outer side of the door window so as to show a rear side of the vehicle. The second visual-recognition mechanism includes a first mirror, a sub window, and a second mirror. The first mirror is provided in a door-mirror housing of the door mirror mechanism so as to show a range from a side of the vehicle including an area below the door mirror mechanism to a front side of the vehicle. The sub window transmits light reflected by the first mirror and extends continuously from the door window toward the front side of the vehicle via a frame. The second mirror reflects the light transmitted through the sub window toward a vehicle occupant. The second visual-recognition mechanism is configured such that brightness of the light to be received by the vehicle occupant is set substantially equal to brightness of the light at the first visual-recognition mechanism.

According to another aspect of the present invention, an on-vehicle multidirectional visual-recognition device includes a first visual-recognition mechanism and a second visual-recognition mechanism. The first visual-recognition mechanism includes a door window and a door mirror. The door window is for a front door of a vehicle. The door mirror is of a door mirror mechanism provided on a vehicle-body side portion, which includes the front door, in a vicinity of an outer side of the door window so as to show a rear side of the vehicle. The second visual-recognition mechanism includes a first mirror, a sub window, and a second mirror. The first mirror is provided in a door-mirror housing of the door mirror mechanism so as to show a range from a side of the vehicle including an area below the door mirror mechanism to a front side of the vehicle. The sub window is disposed toward the front side of the vehicle via a frame attached to the front door to transmit light reflected by the first mirror. The sub window has a transmittance that is higher than a transmittance of the door window. The second mirror reflects the light transmitted through the sub window toward a vehicle occupant.

According to still another aspect of the present invention, an on-vehicle multidirectional visual-recognition device includes a first visual-recognition mechanism and a second visual-recognition mechanism. The first visual-recognition mechanism includes a door window and a door mirror. The door window is for a front door of a vehicle. The door mirror is of a door mirror mechanism provided on a vehicle-body side portion, which includes the front door, in a vicinity of an outer side of the door window so as to show a rear side of the vehicle. The second visual-recognition mechanism includes a first mirror, a sub window, and a second mirror. The first mirror is provided in a door-mirror housing of the door mirror mechanism so as to show a range from a side of the vehicle including an area below the door mirror mechanism to a front side of the vehicle. The sub window is disposed toward the front side of the vehicle via a frame attached to the front door to transmit light reflected by the first mirror. The second mirror reflects the light transmitted through the sub window toward a vehicle occupant. At least one of the first mirror and the second mirror has a reflectance that is higher than a reflectance of the door mirror.

According to the other aspect of the present invention, an on-vehicle multidirectional visual-recognition device includes a first visual-recognition mechanism and a second visual-recognition mechanism. The first visual-recognition mechanism includes a door window and a door mirror. The door window is for a front door of a vehicle. The door mirror is of a door mirror mechanism provided on a vehicle-body side portion, which includes the front door, in a vicinity of an outer side of the door window so as to show a rear side of the vehicle. The second visual-recognition mechanism includes a first mirror, a sub window, and a second mirror. The first mirror is provided in a door-mirror housing of the door mirror mechanism so as to show a range from a side of the vehicle including an area below the door mirror mechanism to a front side of the vehicle. The sub window is disposed toward the front side of the vehicle via a frame attached to the front door to transmit light reflected by the first mirror. The second mirror reflects the light transmitted through the sub window toward a vehicle occupant. At least one of the first mirror, the second mirror, and the sub window includes a color film to transmit light of a specific wavelength and absorb light of a remaining wavelength so as to make the light of the specific wavelength distinctive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

First, second, and third embodiments of the present invention will be described below in detail.

First Embodiment

Figure 1:
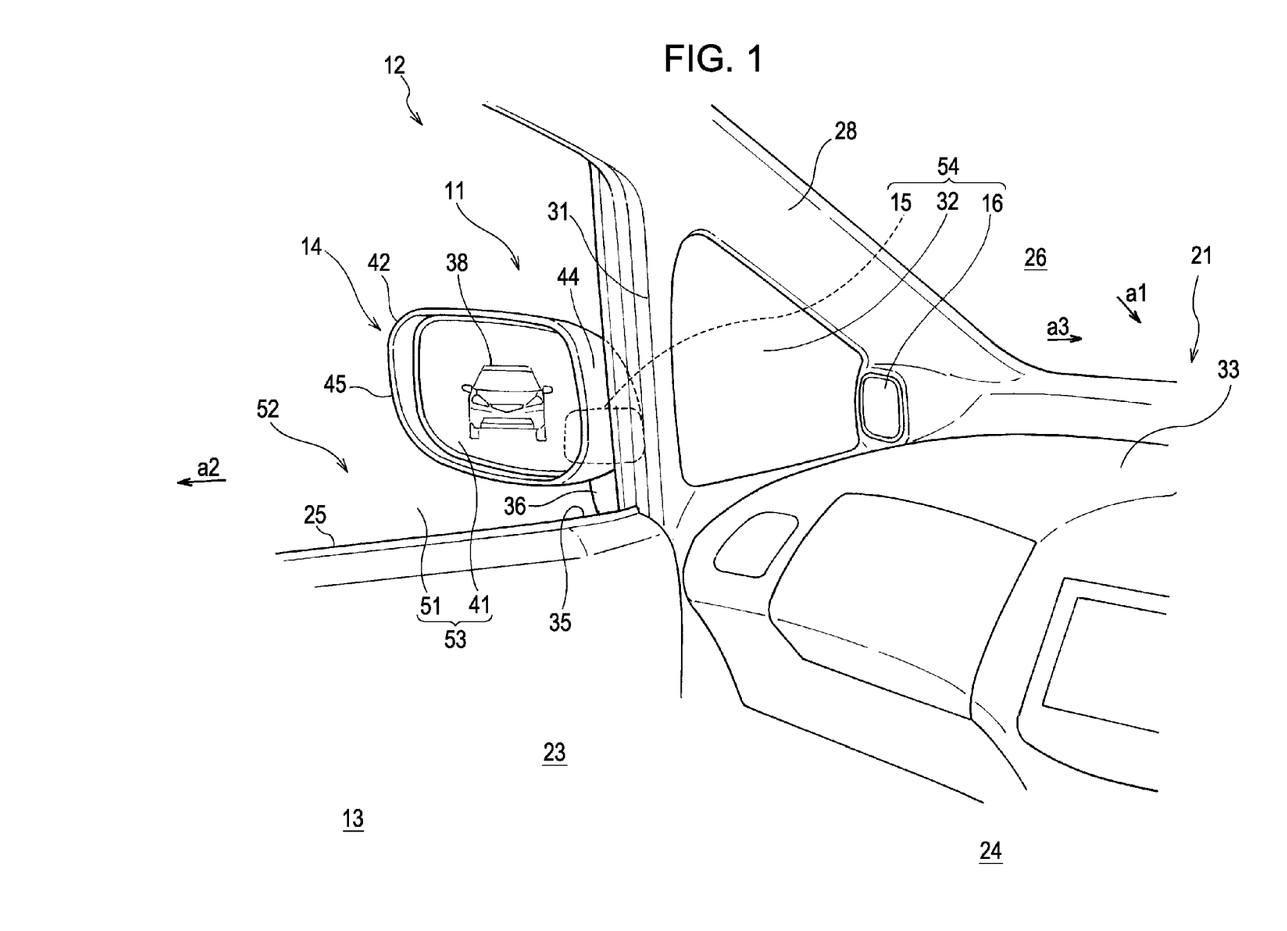
FIG. 1 is a perspective view of an on-vehicle multidirectional visual-recognition device according to a first embodiment of the present invention.
Figure 2:
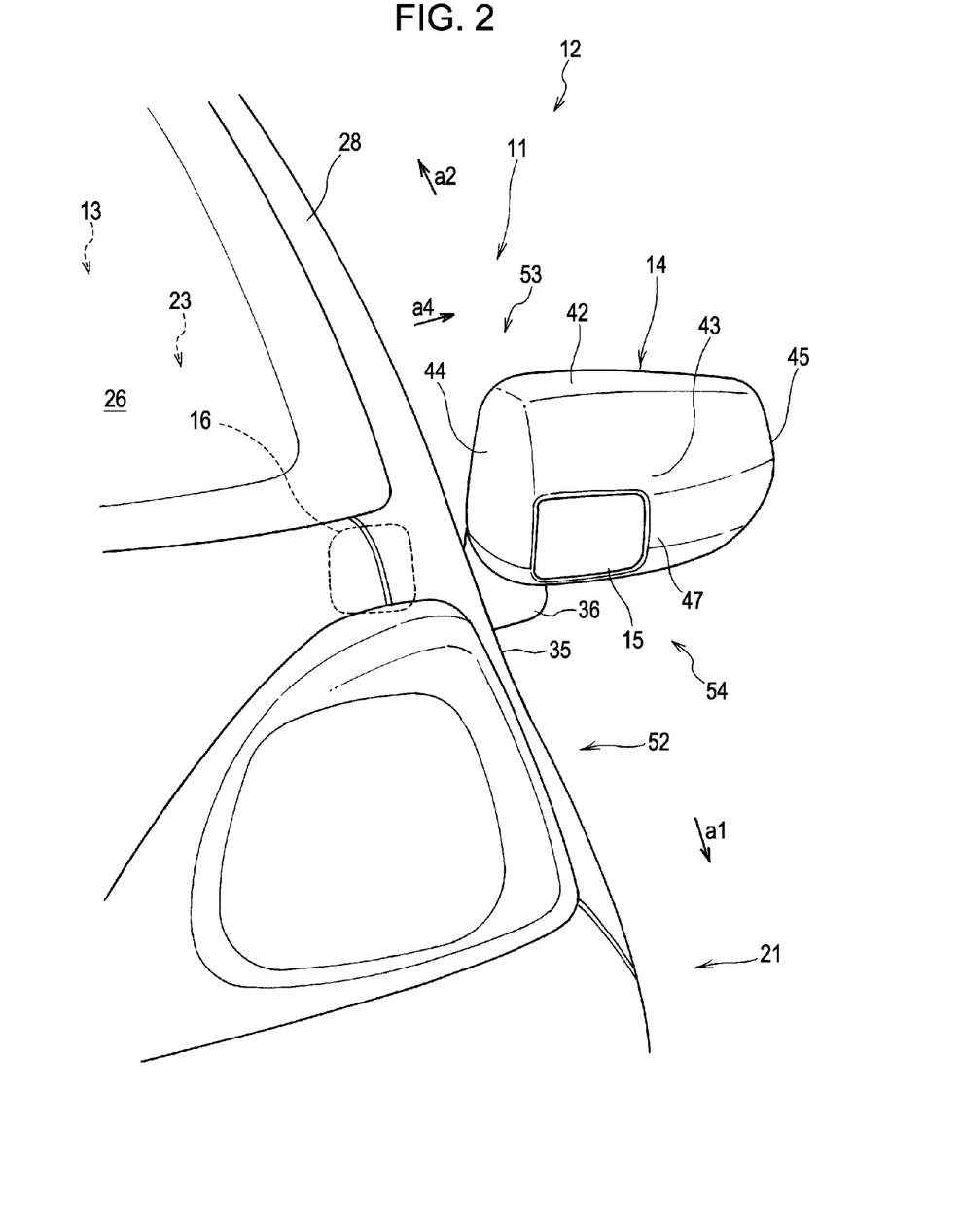
FIG. 2 is a perspective view of a first mirror included in the on-vehicle multidirectional visual-recognition device according to the first embodiment.

As shown in FIGS. 1 and 2, an on-vehicle multidirectional visual-recognition device 11 according to a first embodiment can be used for viewing the front left side (direction indicated by an arrow a1) of a vehicle 12 and is configured to show an image reflected on a first mirror (out-cabin front mirror) 15 provided in a door mirror mechanism 14 outside a vehicle cabin 13 on a second mirror (in-cabin pillar mirror) 16 inside the vehicle cabin 13. On the other hand, the door mirror mechanism 14 shows the rear side (direction indicated by an arrow a2) of the vehicle 12. A detailed description will be provided below.

The vehicle 12 includes a front body 21, the vehicle cabin 13, a passenger seat 23, a driver seat 24, a front left door 25, a windshield 26, front pillars 28 supporting left and right edges of the windshield 26, sub pillars 31 extending downward continuously from the respective front pillars 28, sub windows 32 supported by the sub pillars 31 and the front pillars 28, an instrument panel 33 disposed between the left and right sub pillars 31 as well as between the left and right front pillars 28, and the multidirectional visual-recognition device 11.

The door mirror mechanism 14 includes a support portion 36 attached to a front upper section 35 of the front left door 25 outside the vehicle cabin 13, a door mirror 41 of the door mirror mechanism 14 that reflects light so as to show a rear object 38 (image) in the rear (the direction of the arrow a2), and a door-mirror housing 42 that supports the door mirror 41 of the door mirror mechanism 14.

The support portion 36 supports the door-mirror housing 42 in a rotatable manner, that is, in a foldable manner.

The door-mirror housing 42 is formed by molding plastic into a box shape and has a front portion 43 facing the front (direction indicated by an arrow a3) of the vehicle 12, and an inner side portion 44 and an outer side portion 45 that extend continuously from the front portion 43. The first mirror (out-cabin front mirror) 15 is integrally formed in a lower section 47 of the front portion 43.

The first mirror (out-cabin front mirror) 15 is a convex mirror, and the radius and the orientation of the convex surface thereof are set such that the front left side of the vehicle 12 (see FIG. 3A) can be shown on the second mirror 16. The second mirror 16 is a plane mirror.

Next, the on-vehicle multidirectional visual-recognition device 11 according to the first embodiment will be mainly described with reference to FIGS. 1, 2, and 4.

The on-vehicle multidirectional visual-recognition device 11 includes a first visual-recognition mechanism 53 and a second visual-recognition mechanism 54. Specifically, the first visual-recognition mechanism 53 is constituted of a door window 51 for a front door (front left door 25) of the vehicle 12, and the door mirror 41 of the door mirror mechanism 14 provided on a vehicle-body side portion 52, located near an outer side (direction of an arrow a4) of the door window 51 and including the front door (front left door 25), so as to show the rear side (the direction of the arrow a2) of the vehicle 12. The second visual-recognition mechanism 54 is constituted of the first mirror (out-cabin front mirror) 15 provided in the door-mirror housing 42 of the door mirror mechanism 14 so as to show a range from the side of the vehicle 12 including an area below the door mirror mechanism 14 to the front side of the vehicle 12, the sub window 32 that transmits light reflected by the first mirror (out-cabin front mirror) 15 and that extends continuously from the door window 51 toward the front side of the vehicle via a frame (sub pillar 31), and the second mirror (in-cabin pillar mirror) 16 that reflects the light transmitted through the sub window 32 toward a vehicle occupant (driver) Sn. The second visual-recognition mechanism 54 is configured such that the brightness of the light (reflected light 56) to be received by the vehicle occupant (driver) Sn is set substantially equal to the brightness of light (reflected light 57) of the first visual-recognition mechanism 53.

The expression "set substantially equal to" means that when the vehicle occupant (driver) Sn sitting in the driver seat 24 visually compares the first visual-recognition mechanism 53 and the second visual-recognition mechanism 54, the vehicle occupant (driver) Sn senses substantially no difference in brightness therebetween.

The reflected light 57 of the first visual-recognition mechanism 53 is a light ray traveling from the door mirror 41 toward the vehicle occupant (driver) Sn via the door window 51, and the reflected light 57 has a brightness that can be sensed by the human eye when viewing the door mirror 41.

The reflected light 56 of the second visual-recognition mechanism 54 is a light ray traveling from the second mirror (in-cabin pillar mirror) 16 toward the vehicle occupant (driver) Sn, and the reflected light 56 has a brightness that can be sensed by the human eye when viewing the second mirror (in-cabin pillar mirror) 16.

In detail, the brightness is quantitatively set as described below.

The on-vehicle multidirectional visual-recognition device 11 has an attenuation factor W1 in the first visual-recognition mechanism 53 and an attenuation factor W2 in the second visual-recognition mechanism 54. The attenuation factors W1 and W2 are set substantially equal to each other at, for example, about 15%.

An attenuation factor is the rate of reduction of light intensity (brightness) expressed as percentage (%). For example, if the light intensity (brightness) Fi of incident light is defined as 100, the light intensity (brightness) Fo of reflected light reflected to near an eye is 85.

Although already described above, the expression "set substantially equal to" is another way of saying that the attenuation factor W1 of the first visual-recognition mechanism 53 and the attenuation factor W2 of the second visual-recognition mechanism 54 are set substantially equal to each other, and the term "substantially" is used to refer to a range from an upper limit to a lower limit of tolerance (e.g., 12% to 17%). On the other hand, even if the term "substantially" is to be omitted so as to limit the expression to "set equal to each other", the expression would still include a desired tolerance range.

The attenuation factor W1 of the first visual-recognition mechanism 53 is a value obtained by adding a reduction rate based on a transmittance (visible-ray transmittance) td of the door window 51 to a reduction rate based on a reflectance $\rho d$ of the door mirror 4.

The attenuation factor W2 of the second visual-recognition mechanism 54 is a value obtained by adding a reduction rate based on a transmittance (visible-ray transmittance) ts of the sub window 32 and a reduction rate based on a reflectance $\rho 2$ of the second mirror (in-cabin pillar mirror) 16 to a reduction rate based on a reflectance $\rho 1$ of the first mirror (out-cabin front mirror) 15.

A reflectance $\rho$ is a ratio F2/F1 between the light intensity (brightness) F2 of reflected light and the light intensity (brightness) F1 of incident light, and is expressed as percentage (%).

A transmittance (visible-ray transmittance) t is a ratio Fp/F1 between the light intensity (brightness) Fp of transmitted light and the light intensity (brightness) F1 of incident light, and is expressed as percentage (%).

In the sub window 32, the transmittance (visible-ray transmittance) ts is set higher than the transmittance (visible-ray transmittance) td of the door window 51.

The material used for forming the door window 51 is a known material, such as glass.

The transmittance (visible-ray transmittance) td of the door window 51 is set to 90% so as to reduce the light intensity (brightness) by 10% (a reduction rate expressed as percentage (%) is defined as an attenuation factor).

It is to be noted that a set value includes a range of error or a range from an upper limit to a lower limit of tolerance, and ranges from, for example, 88% to 92% even if the set value is to be limited to 90%.

The material used for forming the sub window 32 is a known material, such as glass.

The transmittance (visible-ray transmittance) ts of the sub window 32 is set to 95% so as to reduce the light intensity (brightness) by 5% (a reduction rate expressed as percentage (%) is defined as an attenuation factor). Thus, the transmittance (visible-ray transmittance) ts of the sub window 32 is higher than the transmittance (visible-ray transmittance) td of the door window 51, which is 90%.

Regarding the first mirror (out-cabin front mirror) 15 and the second mirror (in-cabin pillar mirror) 16, the reflectance $\rho 1$ and the reflectance $\rho 2$ thereof are both set to a value substantially equal to the reflectance $\rho d$ of the door mirror 41.

The reflectance $\rho d$ of the door mirror 41 is set to 95% so as to reduce the light intensity (brightness) by 5% (a reduction rate expressed as percentage (%) is defined as an attenuation factor).

The reflectance $\rho 1$ of the first mirror (out-cabin front mirror) 15 is set to 95% so as to reduce the light intensity (brightness) by 5% (a reduction rate expressed as percentage (%) is defined as an attenuation factor).

The reflectance $\rho 2$ of the second mirror (in-cabin pillar mirror) 16 is set to 95% so as to reduce the light intensity (brightness) by 5% (a reduction rate expressed as percentage (%) is defined as an attenuation factor).

Figure 3A:
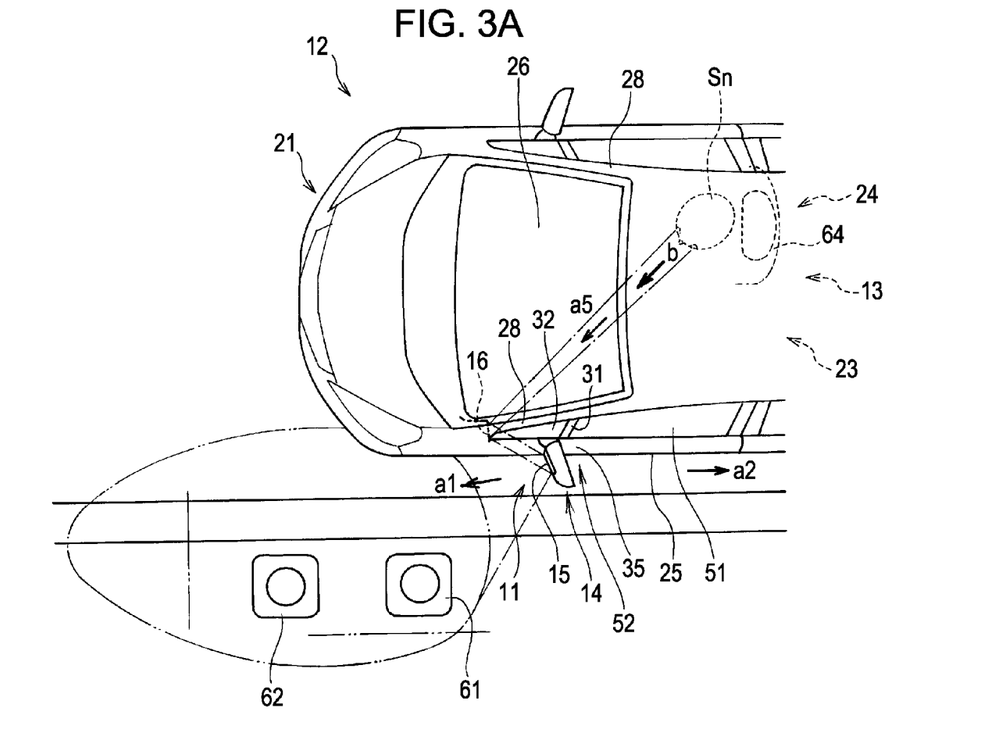
FIGS. 3A and 3B are diagrams illustrating the mechanism of how the on-vehicle multidirectional visual-recognition device according to the first embodiment shows a lower left front side of the vehicle.

Next, the operation of the on-vehicle multidirectional visual-recognition device 11 according to the first embodiment of the present invention will be described with reference to FIGS. 1, 3A, 3B, and 4. FIG. 3A is a plan view, and FIG. 3B is a diagram as viewed along an arrow b in FIG. 3A.

The condition here is such that a first object 61 and a second object 62 are disposed on the front left side and the lower side of the vehicle 12, in other words, in the vicinity of the front left wheel. In this case, the driver Sn has an average physique.

Figure 3B:
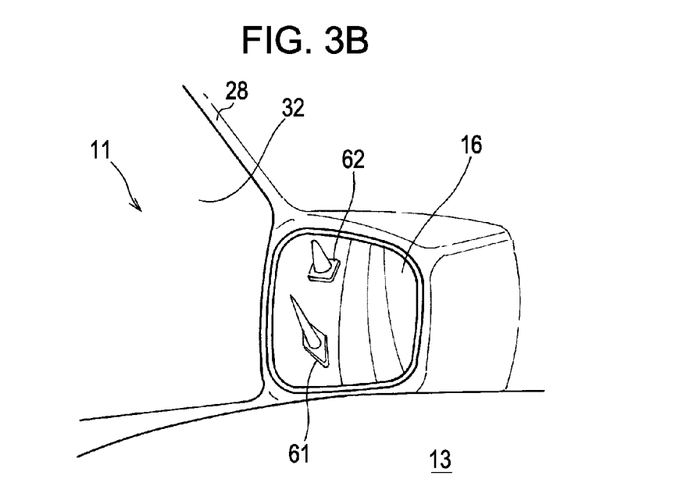

Referring to FIGS. 3A and 3B, when the vehicle occupant (driver) Sn sitting in a seat 64 of the driver seat 24 looks in the front-left direction (direction indicated by an arrow a5) to view the second mirror (in-cabin pillar mirror) 16, the multidirectional visual-recognition device 11 allows the vehicle occupant (driver) Sn to visually check a blind side using the second mirror (in-cabin pillar mirror) 16 since reflected light from the first object 61 and the second object 62 located at the blind side reaches the driver's eyes, as shown in FIG. 3B.

In detail, the reflected light from the first object 61 and the second object 62 is reflected at the first mirror (out-cabin front mirror) 15, and the reflected light at the first mirror (out-cabin front mirror) 15 reaches the second mirror (in-cabin pillar mirror) 16. Since the driver Sn visually receives the reflected light from the second mirror (in-cabin pillar mirror) 16, the driver Sn can view the condition at the blind side, as shown in FIG. 3B, so as to visually check the blind side.

Figure 4:
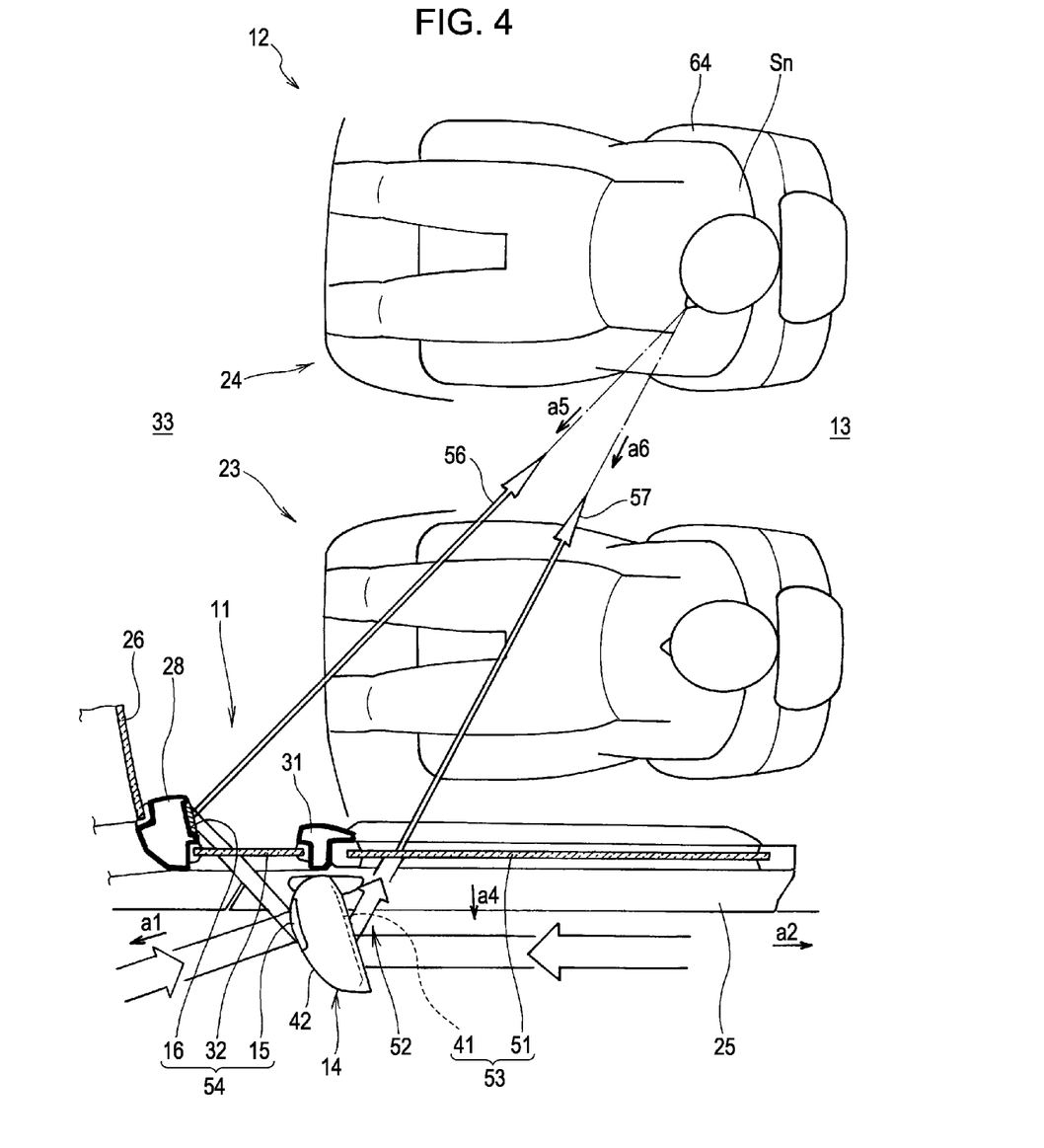
FIG. 4 schematically illustrates the mechanism of how the on-vehicle multidirectional visual-recognition device according to the first embodiment reduces a difference in brightness between images.

In this case, in the on-vehicle multidirectional visual-recognition device 11, when the vehicle occupant (driver) Sn views the second visual-recognition mechanism 54, specifically, views the second mirror (in-cabin pillar mirror) 16 (in the direction of the arrow a5), as shown in FIG. 4, the light intensity (brightness) of the reflected light 56 when the first object 61 and the second object 62 are viewed with the second mirror (in-cabin pillar mirror) 16, as shown in FIG. 3B, becomes 85% due to the attenuation factor W2 of the second visual-recognition mechanism 54 (W2=15%=(5% attenuation in the first mirror (out-cabin front mirror) 15+5% attenuation in the sub window 32+5% attenuation in the second mirror (in-cabin pillar mirror) 16)).

The arrow indicating the light is gradually decreased in width so as to indicate that the brightness of the light decreases and becomes darker. The width of an arrow denoting the reflected light 56 is made smaller than the width of light traveling from the first object 61 and the second object 62 toward the first mirror (out-cabin front mirror) 15.

On the other hand, as shown in FIG. 4, when the vehicle occupant (driver) Sn views the first visual-recognition mechanism 53, specifically, views the door mirror 41 via the door window 51 (in the direction of the arrow a6), the light intensity (brightness) of the reflected light 57 when the rear object 38 (such as a vehicle in the rear, as shown in FIG. 1) behind the vehicle 12 is viewed with the door mirror 41 becomes 85% due to the attenuation factor W1 of the first visual-recognition mechanism 53 (W1=15%=5% attenuation in the door mirror 41+10% attenuation in the door window 51).

The arrow indicating the light is gradually decreased in width so as to indicate that the brightness of the light decreases and becomes darker. The width of an arrow denoting the reflected light 57 is made smaller than the width of light traveling from the rear object 38 (such as the vehicle in the rear, as shown in FIG. 1) toward the door mirror 41.

In this manner, in the on-vehicle multidirectional visual-recognition device 11, the brightness of a viewed image shown on the door mirror 41 and the brightness of a viewed image shown on the second mirror (in-cabin pillar mirror) 16 are substantially equal to each other at 85%. Thus, no visual adjustment to the brightness is necessary each time, thereby preventing the vehicle occupant (driver) Sn from feeling that the images are too bright or too dark and thus providing enhanced viewability.

Second Embodiment

Figure 5:
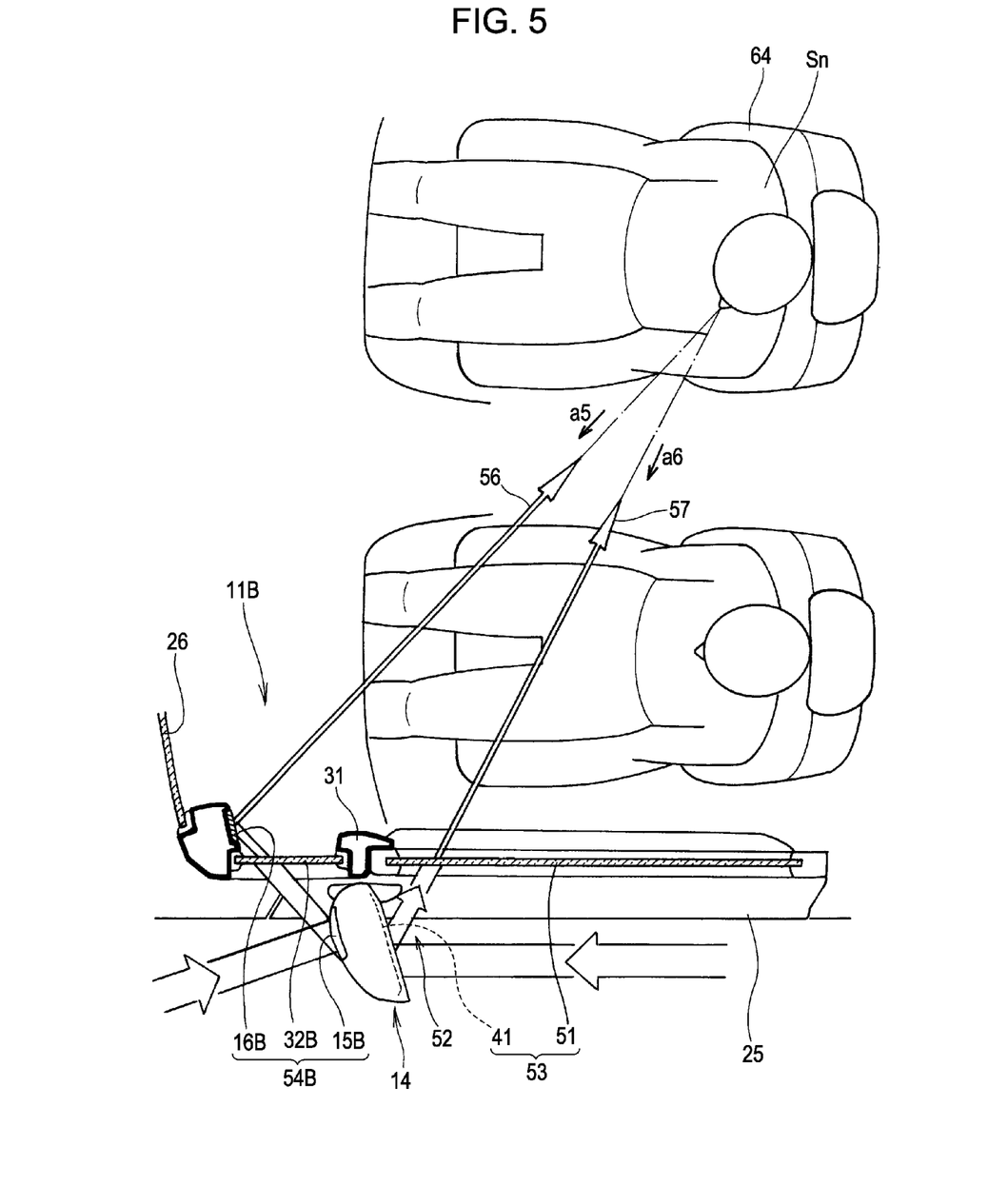
FIG. 5 is a plan view of an on-vehicle multidirectional visual-recognition device according to a second embodiment, schematically illustrating the mechanism of how the on-vehicle multidirectional visual-recognition device reduces a difference in brightness between images.

An on-vehicle multidirectional visual-recognition device 11B according to a second embodiment will be described with reference to FIG. 5. FIG. 5 is a diagram corresponding to FIG. 4. Components similar to those in the first embodiment shown in FIGS. 1 to 4 are given the same reference numerals, and descriptions thereof will not be repeated.

In the on-vehicle multidirectional visual-recognition device 11B according to the second embodiment, at least one of or each of a first mirror (out-cabin front mirror) 15B and a second mirror (in-cabin pillar mirror) 16B, specifically, each mirror in this embodiment, is configured such that the reflectance $\rho 1B$ of the first mirror (out-cabin front mirror) 15B and the reflectance $\rho 2B$ of the second mirror (in-cabin pillar mirror) 16B are set higher than the reflectance $\rho d$ of the door mirror 41.

The door mirror 41 has a reflectance $\rho d$ of 95%, as in the first embodiment, and forms reflected light 57 with a light intensity (brightness) of 85%.

The reflectance $\rho 1B$ of the first mirror (out-cabin front mirror) 15B is set to 97.5%, which is higher than the reflectance $\rho d$ ($\rho d=95\%$) of the door mirror 41. The first mirror (out-cabin front mirror) 15B is configured to reduce the light intensity (brightness) of reflected light by 2.5% (a reduction rate expressed as percentage (%) is defined as an attenuation factor).

The reflectance $\rho 2B$ of the second mirror (in-cabin pillar mirror) 16B is set to 97.5%, which is higher than the reflectance $\rho d$ ($\rho d=95\%$) of the door mirror 41. The second mirror (in-cabin pillar mirror) 16B is configured to reduce a light intensity (brightness) of 87.5% of reflected light transmitted through a sub window 32B by 2.5% (a reduction rate expressed as percentage (%) is defined as an attenuation factor) so as to form reflected light 56 with a light intensity (brightness) of 85%.

The sub window 32B has a visible-ray transmittance tsB set at 90% and is configured to reduce the light intensity (brightness) by 10% (a reduction rate expressed as percentage (%) is defined as an attenuation factor). The visible-ray transmittance tsB is equal to the transmittance (visible-ray transmittance) td of the door window 51, which is 90%.

The on-vehicle multidirectional visual-recognition device 11B according to the second embodiment achieves effects and advantages similar to those of the on-vehicle multidirectional visual-recognition device 11 according to the first embodiment.

Specifically, the brightness of a viewed image shown on the door mirror 41 and the brightness of a viewed image shown on the second mirror (in-cabin pillar mirror) 16B are substantially equal to each other at 85%, thereby providing enhanced viewability.

Third Embodiment

Figure 6:
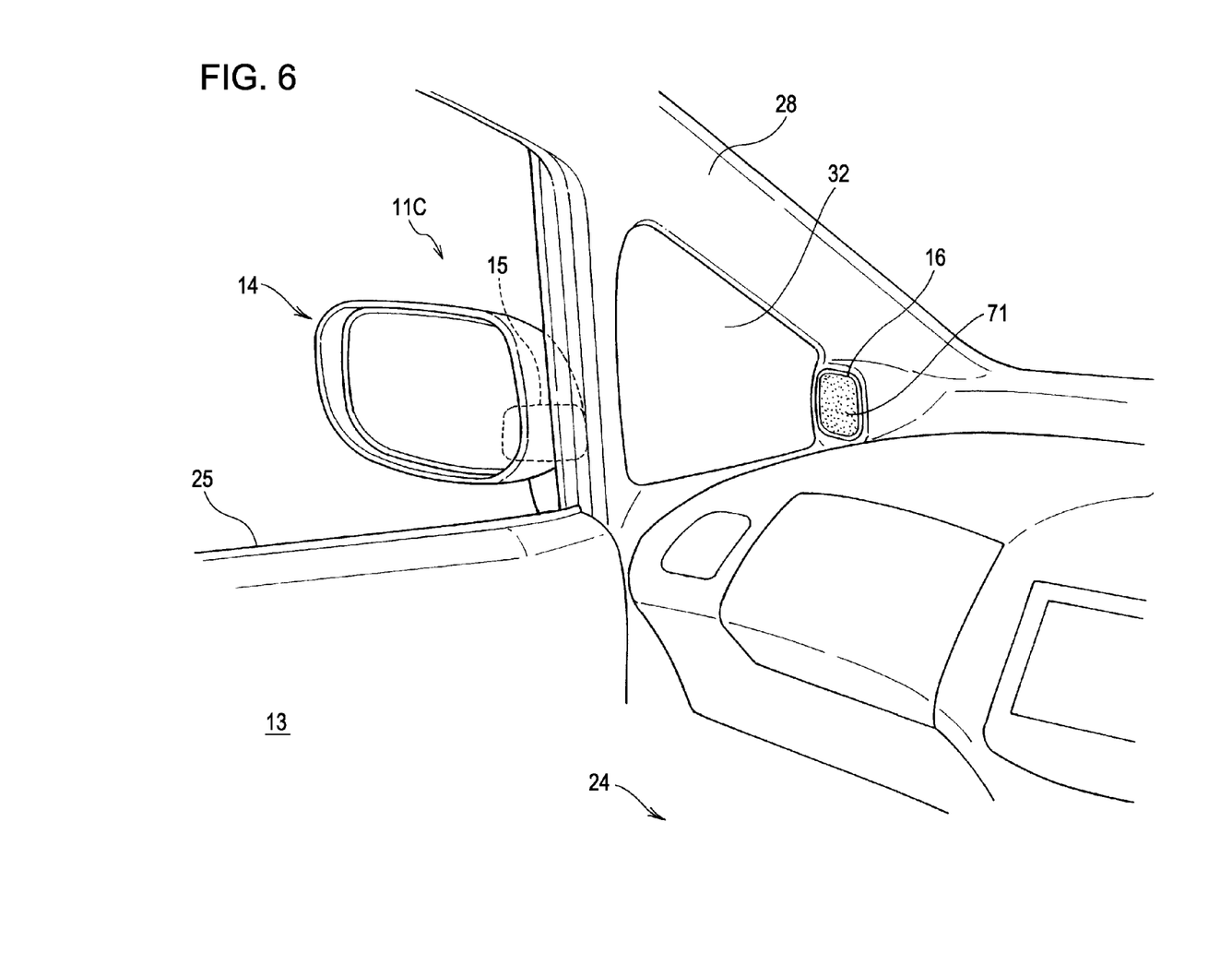
FIG. 6 is a perspective view of an on-vehicle multidirectional visual-recognition device according to a third embodiment.

An on-vehicle multidirectional visual-recognition device 11C according to a third embodiment will be described with reference to FIG. 6. FIG. 6 is a diagram corresponding to FIG. 1. Components similar to those in the first embodiment shown in FIGS. 1 to 4 are given the same reference numerals, and descriptions thereof will not be repeated.

In the on-vehicle multidirectional visual-recognition device 11C according to the third embodiment, at least one of the first mirror (out-cabin front mirror) 15, the second mirror (in-cabin pillar mirror) 16, and the sub window 32, specifically, the second mirror (in-cabin pillar mirror) 16 in this embodiment, is provided with a color film 71 (indicated with a dot pattern) that transmits light of a specific wavelength and absorbs light of the remaining wavelengths so as to make the light of the specific wavelength distinctive.

The color film 71 has such a spectral characteristic that the light to be transmitted therethrough has a wavelength around a range between 500 nm and 560 nm. A wavelength ranging between 500 nm and 560 nm is within a visible-light range and the color of light thereof is green. In other words, the color of the color film 71 is green.

In the on-vehicle multidirectional visual-recognition device 11C according to the third embodiment, of the colors of the first object 61 and the second object 62 shown on the second mirror (in-cabin pillar mirror) 16, the light (color) of the specific wavelength is highlighted by the color film 71, thereby showing a clear image on the second mirror (in-cabin pillar mirror) 16 and thus providing enhanced viewability.

In detail, when light reflected by the first mirror (out-cabin front mirror) 15 disposed in the door mirror mechanism 14 is transmitted through the color film 71 overlying the second mirror (in-cabin pillar mirror) 16, the color film 71 mainly transmits a wavelength ranging between 500 nm and 560 nm of the wavelengths of visible light. In consequence, this is advantageous in that the image shown on the second mirror (in-cabin pillar mirror) 16 can be brightly and clearly recognized by the vehicle occupant (driver) Sn.

Although the on-vehicle multidirectional visual-recognition device according to the embodiments of the present invention is used in a vehicle, the multidirectional visual-recognition device can be used in alternatives other than vehicles.

The on-vehicle multidirectional visual-recognition device according to the embodiments of the present invention is suitable for vehicles.

In the embodiments of the present invention, the brightness of the door mirror of the first visual-recognition mechanism sensed by the vehicle occupant (driver) and the brightness of the second mirror (in-cabin pillar mirror) of the second visual-recognition mechanism are made substantially equal to each other, thereby providing enhanced viewability.

In the embodiments of the present invention, the brightness of the light from the second visual-recognition mechanism sensed by the vehicle occupant (driver) is increased, as compared with a case where the sub window has the same transmittance as that of the door window, thereby advantageously allowing the vehicle occupant (driver) to view a bright image even with the second visual-recognition mechanism.

Specifically, although light undergoing two repetitive reflections from the first mirror to the second mirror in the second visual-recognition mechanism becomes darker than reflected light undergoing one reflection, and the shown image ultimately becomes darker, the image (light) on the second visual-recognition mechanism is made brighter so that the images on the first visual-recognition mechanism and the second visual-recognition mechanism are made similar to each other in terms brightness, thereby providing enhanced viewability.

Accordingly, in comparison to a case where the mirrors have the same reflectance as that of the door mirror, the brightness of the light from the second visual-recognition mechanism sensed by the vehicle occupant (driver) is increased, thereby advantageously allowing the vehicle occupant (driver) to view a bright image even with the second visual-recognition mechanism.

Specifically, although light undergoing two repetitive reflections from the first mirror to the second mirror in the second visual-recognition mechanism becomes darker than reflected light undergoing one reflection, and the shown image ultimately becomes darker, the image (light) on the second visual-recognition mechanism is made brighter so that the images on the first visual-recognition mechanism and the second visual-recognition mechanism are made similar to each other in terms of brightness, thereby providing enhanced viewability.

In the embodiments of the present invention, the second visual-recognition mechanism may be configured such that the brightness of the light to be received by the vehicle occupant is set substantially equal to that of the first visual-recognition mechanism.

Accordingly, the brightness of the image on the first visual-recognition mechanism and the brightness of the image on the second visual-recognition mechanism become substantially equal to each other, thereby advantageously providing enhanced viewability.

In the embodiments of the present invention, the sub window may have a transmittance that is set higher than that of the door window.

Accordingly, in comparison to a case where the sub window has the same transmittance as that of the door window, the brightness of the light from the second visual-recognition mechanism sensed by the vehicle occupant (driver) is increased, thereby advantageously allowing the vehicle occupant (driver) to view a bright image even with the second visual-recognition mechanism.

Specifically, although light undergoing two repetitive reflections from the first mirror to the second mirror in the second visual-recognition mechanism becomes darker than reflected light undergoing one reflection, and the shown image ultimately becomes darker, the image (light) on the second visual-recognition mechanism is made brighter so that the images on the first visual-recognition mechanism and the second visual-recognition mechanism are made similar to each other in terms of brightness, thereby providing enhanced viewability.

In the embodiments of the present invention, at least one of the first mirror and the second mirror may have a reflectance that is set higher than that of the door mirror.

Accordingly, in comparison to a case where the mirrors have the same reflectance as that of the door mirror, the brightness of the light from the second visual-recognition mechanism sensed by the vehicle occupant (driver) is increased, thereby advantageously allowing the vehicle occupant (driver) to view a bright image even with the second visual-recognition mechanism.

Specifically, although light undergoing two repetitive reflections from the first mirror to the second mirror in the second visual-recognition mechanism becomes darker than reflected light undergoing one reflection, and the shown image ultimately becomes darker, the image (light) on the second visual-recognition mechanism is made brighter so that the images on the first visual-recognition mechanism and the second visual-recognition mechanism are made similar to each other in terms of brightness, thereby providing enhanced viewability.

In the embodiments of the present invention, of the colors of the image shown on the second visual-recognition mechanism, the light (color) of the specific wavelength is highlighted by the color film, thereby showing a clear image and thus providing enhanced viewability.

In the embodiments of the present invention, the color film may be characterized in that the wavelength of light to be transmitted therethrough is set so that spectral characteristics centered on a wavelength ranging between 500 nm and 560 nm is obtained.

This is advantageous in that the image shown on the second mirror can be brightly and clearly recognized by the vehicle occupant, regardless of the time of the day or the weather.

Obviously, numerous modifications and variations of the present invention are possible in light of the above teachings. It is therefore to be understood that within the scope of the appended claims, the invention may be practiced otherwise than as specifically described herein.

What is claimed is:

1. An on-vehicle multidirectional visual-recognition device comprising:
    a first visual-recognition mechanism having a first attenuation factor, said first visual-recognition mechanism comprising:
        a door window for a front door of a vehicle; and
        a door mirror of a door mirror mechanism provided on a vehicle-body side portion, which includes the front door, in a vicinity of an outer side of the door window so as to show a rear side of the vehicle; and
    a second visual-recognition mechanism comprising:
        a first mirror provided in a door-mirror housing of the door mirror mechanism so as to show a range from a side of the vehicle including an area below the door mirror mechanism to a front side of the vehicle;
        a sub window to transmit light reflected by the first mirror and to extend continuously from the door window toward the front side of the vehicle via a frame; and
        a second mirror to reflect the light transmitted through the sub window toward a vehicle occupant, the second visual-recognition mechanism having a second attenuation factor substantially equal to the first attenuation factor of the first visual-recognition mechanism,
    wherein the first attenuation factor is a value obtained by adding a reduction rate based on a transmittance of the door window to a reduction rate based on a reflectance of the door mirror,
    wherein the second attenuation factor is a value obtained by adding a reduction rate based on a transmittance of the sub window and a reduction rate based on a reflectance of the second mirror to a reduction rate based on a reflectance of the first mirror, and
    wherein the transmittance of the sub window of the second visual-recognition mechanism is greater than the transmittance of the door window of the first visual-recognition mechanism.

2. An on-vehicle multidirectional visual-recognition device comprising:
    a first visual-recognition mechanism having a first attenuation factor, said first visual-recognition mechanism comprising:
        a door window for a front door of a vehicle; and
        a door mirror of a door mirror mechanism provided on a vehicle-body side portion, which includes the front door, in a vicinity of an outer side of the door window so as to show a rear side of the vehicle; and a second visual-recognition mechanism comprising:
- a first mirror provided in a door-mirror housing of the door mirror mechanism so as to show a range from a side of the vehicle including an area below the door mirror mechanism to a front side of the vehicle;
- a sub window to transmit light reflected by the first mirror and to extend continuously from the door window toward the front side of the vehicle via a frame; and
- a second mirror to reflect the light transmitted through the sub window toward a vehicle occupant, the second visual-recognition mechanism having a second attenuation factor substantially equal to the first attenuation factor of the first visual-recognition mechanism, wherein at least one of the first mirror and the second mirror has a reflectance that is higher than a reflectance of the door mirror, wherein the first attenuation factor is a value obtained by adding a reduction rate based on a transmittance of the door window to a reduction rate based on a reflectance of the door mirror, and wherein the second attenuation factor is a value obtained by adding a reduction rate based on a transmittance of the sub window and a reduction rate based on a reflectance of the second mirror to a reduction rate based on a reflectance of the first mirror.

* * * * *